(12) United States Patent
Connor et al.

(10) Patent No.: US 10,315,776 B2
(45) Date of Patent: Jun. 11, 2019

(54) VEHICLE NAVIGATION METHODS, SYSTEMS AND COMPUTER PROGRAM PRODUCTS

(71) Applicant: Vu Systems, LLC, Morrisville, NC (US)

(72) Inventors: Sidney A. Connor, Columbiana, OH (US); J. Stedman Stevens, Wilmington, NC (US)

(73) Assignee: Vu Systems, LLC, Morrisville, NC (US)

( * ) Notice: Subject to any disclaimer, the term of this patent is extended or adjusted under 35 U.S.C. 154(b) by 0 days.

(21) Appl. No.: 16/127,750

(22) Filed: Sep. 11, 2018

(65) Prior Publication Data

US 2019/0023413 A1    Jan. 24, 2019

Related U.S. Application Data

(63) Continuation of application No. 14/993,536, filed on Jan. 12, 2016.

(Continued)

(51) Int. Cl.
*G06K 9/00* (2006.01)
*B64D 43/00* (2006.01)
(Continued)

(52) U.S. Cl.
CPC .............. *B64D 43/00* (2013.01); *G02B 27/01* (2013.01); *H04N 5/247* (2013.01); *H04N 5/77* (2013.01);
(Continued)

(58) Field of Classification Search
CPC .......... B64D 43/00; H04N 5/77; H04N 5/247; G02B 27/01; G02B 2027/0147; G02B 2027/014
See application file for complete search history.

(56) References Cited

U.S. PATENT DOCUMENTS 5,534,694 A    7/1996 Ball et al.
5,566,073 A    10/1996 Margolin
(Continued)

FOREIGN PATENT DOCUMENTS

WO    WO 99/36904    7/1999

OTHER PUBLICATIONS

Signal to Noise: Understanding it, Measuring it, and Improving it. Part 2—Understanding One Pixel, http://www.cloudynights.com/page/articles/cat/fishing-for-photons/signal-to-noise-understanding-it-measuring-it-and-improving-it-part-2-understanding-one-pixel-r1902, Printed from the Internet on Oct. 26, 2015, 8 pages.

(Continued)

*Primary Examiner* — Howard D Brown, Jr.
(74) *Attorney, Agent, or Firm* — Myers Bigel, P.A.

(57) ABSTRACT

Vehicle navigation methods, systems and computer program products are provided that create a composite video image of a scene from video images of the scene generated by a plurality of video image sensors. The video image from each image sensor includes a respective array of pixels. The composite video image is created by selecting for a composite image pixel at a given position in an array of composite image pixels a pixel at the given position from one of the respective pixel arrays having the highest signal level or highest signal-to-noise ratio. The selecting is repeatedly performed for a plurality of given positions in the array of composite image pixels. The composite video image can be displayed via a display, such as a head-up display utilized in a vehicle.

27 Claims, 6 Drawing Sheets

Related U.S. Application Data

(60) Provisional application No. 62/132,291, filed on Mar. 12, 2015.

(51) Int. Cl.
   *H04N 5/77* (2006.01)
   *G02B 27/01* (2006.01)
   *H04N 5/247* (2006.01)

(52) U.S. Cl.
   CPC ............ *G02B 2027/014* (2013.01); *G02B 2027/0147* (2013.01)

(56) References Cited

U.S. PATENT DOCUMENTS

| | | | |
|---|---|---|---|
| 5,904,724 | A | 5/1999 | Margolin |
| 6,157,876 | A | 12/2000 | Tarleton, Jr. et al. |
| 6,211,809 | B1 | 4/2001 | Stiles |
| 6,329,649 | B1 | 12/2001 | Jack et al. |
| 6,498,620 | B2 | 12/2002 | Schofield et al. |
| 6,984,061 | B1 | 1/2006 | Soderberg et al. |
| 7,089,092 | B1 | 8/2006 | Wood et al. |
| 7,102,130 | B2 | 9/2006 | Kerr |
| 7,196,329 | B1 | 3/2007 | Wood et al. |
| 7,411,194 | B1 | 8/2008 | Everett et al. |
| 7,456,779 | B2 | 11/2008 | Cross et al. |
| 7,483,213 | B2 | 1/2009 | Pochapsky |
| 7,498,994 | B2 | 3/2009 | Vacanti |
| 7,764,324 | B2 | 7/2010 | Andonian et al. |
| 7,859,565 | B2 * | 12/2010 | Schofield ............... B60N 2/002  348/148 |
| 7,924,172 | B1 | 4/2011 | Swearingen et al. |
| 8,761,445 | B2 | 6/2014 | Shamir et al. |
| 9,007,490 | B1 * | 4/2015 | Yuan ....................... G06F 3/017  348/222.1 |
| 9,315,151 | B2 | 4/2016 | Taylor et al. |
| 9,715,631 | B2 * | 7/2017 | Takahashi ................ B60R 1/00 |
| 2002/0047895 | A1 | 4/2002 | Bernardo et al. |
| 2004/0169617 | A1 | 9/2004 | Yelton et al. |
| 2004/0169663 | A1 | 9/2004 | Bernier |
| 2005/0116947 | A1 | 6/2005 | Lovberg et al. |
| 2005/0122254 | A1 | 6/2005 | Ammar |
| 2005/0151080 | A1 | 7/2005 | Vaidya |
| 2005/0179606 | A1 | 8/2005 | Holly |
| 2005/0219135 | A1 | 10/2005 | Lee et al. |
| 2006/0177150 | A1 | 8/2006 | Uyttendaele et al. |
| 2007/0061076 | A1 | 3/2007 | Shulman |
| 2008/0170140 | A1 | 7/2008 | Silver et al. |
| 2008/0260265 | A1 | 10/2008 | Silverstein et al. |
| 2008/0262664 | A1 | 10/2008 | Schnell et al. |
| 2010/0296140 | A1 | 11/2010 | Zahnert et al. |
| 2011/0090343 | A1 | 4/2011 | Alt et al. |
| 2012/0007979 | A1 | 1/2012 | Schneider et al. |
| 2012/0314056 | A1 | 12/2012 | Michiguchi et al. |
| 2013/0063601 | A1 | 3/2013 | Wakabayashi et al. |
| 2013/0116859 | A1 | 5/2013 | Ihlenburg et al. |
| 2013/0128087 | A1 | 5/2013 | Georgiev et al. |
| 2014/0002439 | A1 * | 1/2014 | Lynch ................. G09B 29/007  345/419 |
| 2014/0002660 | A1 | 1/2014 | Takahashi et al. |
| 2014/0010406 | A1 | 1/2014 | Mercier et al. |
| 2014/0015951 | A1 | 1/2014 | Millikan |
| 2014/0240451 | A1 | 8/2014 | Sakano et al. |
| 2015/0040165 | A1 | 2/2015 | Zajac |

OTHER PUBLICATIONS

Glasner et al, "Super-Resolution from a Single Image," http://www.wisdom.weizmann.ac.il/~vision/_single_image_SR/files/single_image_SR.pdf, The Weizmann Institute of Science, Dept. of Computer Science and Applied Mathematics, Israel, Printed from the Internet on Oct. 26, 2015, 8 pages.

Pacheco, J., Final Project_Super-Resolution From a Single Image (Writeup), May 17, 2010, http://cs.brown.edu/courses/csci1950-g/results/final/pachecoj.

International Search Report and Written Opinion for PCT/US2016/019277, dated Feb. 15, 2017, 14 pages.

* cited by examiner

VEHICLE NAVIGATION METHODS, SYSTEMS AND COMPUTER PROGRAM PRODUCTS

RELATED APPLICATION

This application is a continuation application of pending U.S. patent application Ser. No. 14/993,536, filed Jan. 12, 2016, which claims the benefit of and priority to U.S. Provisional Patent Application No. 62/132,291 filed Mar. 12, 2015, the disclosures of which are incorporated herein by reference as if set forth in their entireties.

FIELD OF THE INVENTION

The present invention relates generally to imaging and, more particularly, to imaging methods, systems and computer program products.

BACKGROUND OF THE INVENTION

Moving vehicles, such as aircraft, watercraft, and ground-based vehicles (herein referred to generically as "vehicles") often must operate in conditions of limited visibility due to rain, fog, glare, darkness, and other environmental conditions that prevent a clear view of the surrounding scene. As used herein, the term "scene" refers to a view of an object or of a volume from a particular point and looking in a particular direction in three-dimensional space. Thus, the "scene" visible to a pilot through a cockpit window will change whenever the attitude of the aircraft changes due to pitch, roll, or yaw and/or whenever the position of the aircraft changes its location in three-dimensional space.

It is particularly important that the person or persons operating the vehicle have a clear enough view of the surrounding scene to operate the vehicle safely, e.g., to avoid a crash, collision, or navigation error. A pilot that is landing an aircraft, for example, must be able to not only determine the location of the runway but also be able to see unexpected (or expected) obstacles in enough time to be able to take evasive action or perform some other maneuver to avoid the obstacles.

One approach to this problem is to provide to the pilot an image of the scene as it is captured by an image sensor or camera (hereinafter referred to generically as a "camera") and presenting it to the pilot on a video display unit. A slight improvement on this technique is to use a camera that is receptive to frequencies outside of the normal range of human vision, such as the infra-red (IR) or ultraviolet (UV) frequencies, and presenting those images to the pilot. UV light passes through clouds and fog, for example, and IR light is radiated by heat sources. The images produced by IR and UV cameras, however, look very strange to humans, which make IR and UV images more difficult to understand and process than visible light images, which humans are accustomed to seeing.

Yet another improvement is to combine images from multiple cameras or from cameras sensitive to different frequencies by adding the images together in a process referred to herein as "mixing", in which multiple images are combined according to some ratio. For example, a video mixer may multiply the intensity of one image to 30%, multiply the intensity of another image by 70%, and add the images together to provide an image whose brightest areas have 100% intensity. Conventional mixing techniques may adjust the relative ratios of each image's contribution into the whole, e.g., from 30/70 to 40/60, 80/20, 97/3, or other relative ratio applied to each entire image prior to summing the two images together to provide the output image.

Mixing also has disadvantages. For example, one image may have valuable information but is so bright (or "hot") that by the time it is scaled down to avoid washing out the output image, the desired detail is also lost.

Another approach is to provide an aircraft pilot with a head-up display (HUD) that projects a synthetic image that is visually overlaid on top of the pilot's normal view, i.e., the view from the cockpit window. The synthetic image may display information about the aircraft's altitude, speed, and heading along with graphic elements that identify, highlight, or outline important features of the scene, such as the location of the runway.

One problem, however, is that even the synthetic images representing features and obstacles are usually generated from image data provided by image sensors. In order for a HUD to display representations of features or obstacles as synthetic graphical objects, image sensors on the vehicle must be able to detect those features and obstacles. If the image sensors cannot detect or distinguish the important features or obstacles, the imagery provided by the sensor on the HUD may be of little value to the pilot.

Accordingly, in view of the disadvantages of conventional vision systems used by aircraft and other types of vehicles, there is a need for improved methods and systems that generate composite images from multiple imaging sensors.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Embodiments of the present invention are directed to creating a composite video image from a plurality of video images, and particularly from video images acquired by image sensors of different technologies, for use in facilitating navigation of a vehicle. For example, according to some embodiments, a method for creating a composite video image having an array of composite image pixels includes receiving from a plurality of video image sensors (e.g., image sensors of different technology types) a respective plurality of video images of a scene, wherein each video image comprises a respective array of pixels, and selecting for a composite image pixel at a given position in the array of composite image pixels a pixel at the given position in one of the respective array of pixels that has a highest signal level or signal-to-noise ratio. The selecting is repeatedly performed for a plurality of given positions in the array of composite image pixels. The composite video image may have a higher object resolution than at least one of the video images produced by the image sensors. The composite video image can be displayed via a display, such as a head-up display utilized in a vehicle.

Various types of video image sensors may be utilized including, but not limited to, visible light image sensors, non-visible light image sensors, radio-frequency (RF) image sensors, sound navigation and ranging (SONAR) image sensors, light detection and ranging (LIDAR) image sensors, and Doppler image sensors. In some embodiments, at least one of the plurality of video image sensors is mounted on a vehicle. Exemplary vehicles may include aircraft, watercraft, spacecraft, automobiles, trucks, trains, etc. In some embodiments, the composite video image can be displayed to a person within a vehicle, such as a pilot, co-pilot, crewmember, or a passenger of the vehicle. In some embodiments, the composite image can be displayed external to a vehicle, for example, to a person not located in the vehicle.

In some embodiments, pixels within the displayed composite image can be changed responsive to user input, for example, via a user control and/or via user preferences. For example, in a composite image produced from the selection of pixels from a visible light image sensor and a non-visible light image sensor, a user control can allow a person to selectively change which pixels are displayed in the composite video image from the two image sensors.

According to some embodiments of the present invention, a vehicle navigation method includes receiving from a plurality of video sensors associated with the vehicle a respective plurality of video images of a scene, wherein each video image comprises a respective array of pixels. A composite video image of the scene is created from the plurality of video images. The composite video image includes an array of composite image pixels, and each composite image pixel in the array of composite image pixels is selected from a respective pixel in one of the respective array of pixels that has a highest signal level or highest signal-to-noise ratio. The composite vide image is displayed on a display of the vehicle in real time so that the vehicle can be navigated in real time using the displayed composite video image. At least one of the plurality of video image sensors is mounted on the vehicle, and the plurality of image sensors are selected from visible light image sensors, non-visible light image sensors, RF image sensors, SONAR image sensors, LIDAR image sensors, and Doppler image sensors. The method further includes changing one or more composite image pixels in the displayed composite video image responsive to user input and/or responsive to user preference.

According to some embodiments of the present invention, an imaging system includes first and second video image sensors configured to generate respective first and second video images of a scene, an image processor, and a display. The first and second video image sensors may be of different or similar technologies. Exemplary video image sensors may include, but are not limited to, visible light image sensors, non-visible light image sensors, radio-frequency (RF) image sensors, sound navigation and ranging (SONAR) image sensors, light detection and ranging (LIDAR) image sensors, and Doppler image sensors. In some embodiments, at least one of the first and second video image sensors is mounted to a vehicle, such as an aircraft, a watercraft, a spacecraft, an automobile, a truck, a train, etc.

The first and second video images include respective first and second arrays of pixels. The image processor is configured to receive the first and second video images and create a composite video image that includes an array of composite image pixels and that has higher object resolution than at least one of the first and second video images. For example, for a given pixel position in the composite pixel array, the image processor selects a pixel at the given position from one of the first and second arrays of pixels that has a highest signal level or highest/dominant signal-to-noise ratio.

In some embodiments, the system includes a user control that allows a person to change the pixels displayed within the composite image. For example, in a composite image produced from the selection of pixels from a visible light image sensor and a non-visible light image sensor, a user control can allow a person to selectively change which pixels are displayed in the composite video image from the two image sensors. In other embodiments, the image processor may be configured to change composite image pixels responsive to a stored user preference.

According to other embodiments of the present invention, a method for creating a video image from a plurality of image streams includes receiving a video image from each of a plurality of video image sensors, wherein at least one of the plurality of video image sensors is mounted to a vehicle, combining the plurality of video images according to an algorithm to produce an output video image, and adjusting the algorithm based on a state or condition of the vehicle. Adjusting the algorithm based on a state or condition of the vehicle may include adjusting the algorithm based on one or more of the following: a height of the vehicle above ground or water, a depth of the vehicle below water, a geographic location of the vehicle, a position of the vehicle relative to an obstacle, an absolute or relative quality or characteristic of at least one of the plurality of video sensors, an absolute or relative quality or characteristic or at least one of the video images, and a speed, heading, or attitude of the vehicle. Adjusting the algorithm may include one or more of the following: modifying a coefficient of the algorithm; adding, subtracting, or modifying a term of the algorithm; changing the algorithm; performing a plurality of different algorithms and either: selecting the output of one the plurality of algorithms or combining the outputs of at least two of the plurality of algorithms.

According to other embodiments of the present invention, a method for creating a video image from a plurality of image streams includes receiving a video image from each of a plurality of video image sensors, wherein at least one of the plurality of video image sensors is mounted to a vehicle; pre-enhancing at least one of the plurality of video images; and combining the plurality of video images to produce an output video image. In some embodiments, pre-enhancing includes applying a super-resolution technique to a video image to increase the resolution of the video image.

According to other embodiments of the present invention, a method for creating a video image from a plurality of image streams includes receiving a video image from each of a plurality of video image sensors, wherein at least one of the plurality of video image sensors is mounted to a vehicle; receiving ground data that is at a resolution that is higher than the resolution of at least one of the video image sensors; using the ground data to determine expected image features; and combining the plurality of video images based on at least one of maximum information content, adherence to the expected image features, and image quality metrics.

In the field of aviation, embodiments of the present invention are particularly advantageous because runways and obstacles on approach can be seen by pilots regardless of the visibility conditions. As such weather-related delays and cancellations may be reduced, access to more runways worldwide may increase, and air travel safety may be increased.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

DETAILED DESCRIPTION

Figure 1:
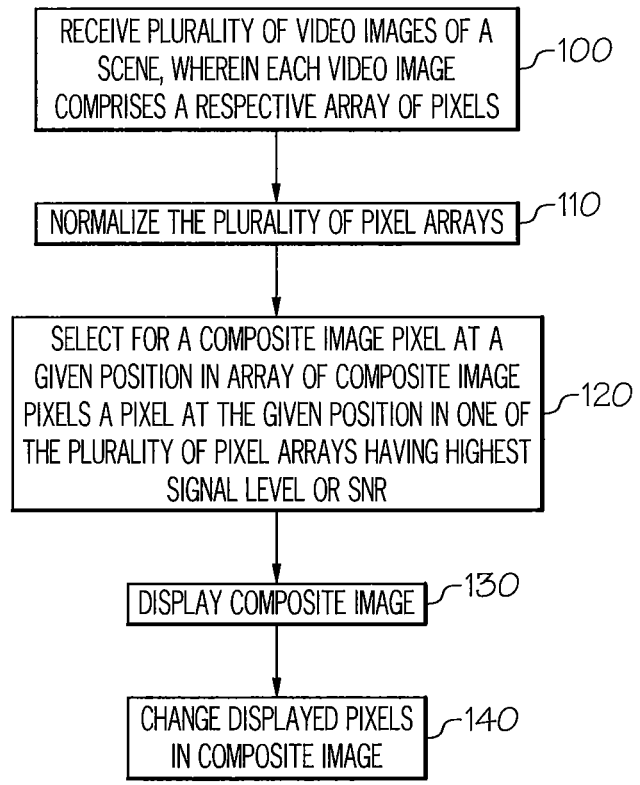
FIGS. 1-2 are flow charts illustrating an exemplary process for creating composite images from multiple image streams, according to some embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity. In addition, the sequence of operations (or steps) is not limited to the order presented in the figures and/or claims unless specifically indicated otherwise. Features described with respect to one figure or embodiment can be associated with another embodiment or figure although not specifically described or shown as such.

The terminology used herein is for the purpose of describing particular embodiments only and is not intended to be limiting of the invention. As used herein, the singular forms "a", "an" and "the" are intended to include the plural forms as well, unless the context clearly indicates otherwise.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

As used herein, the term "and/or" includes any and all combinations of one or more of the associated listed items and may be abbreviated as "/".

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terms "image stream", "video stream", "video image", and "video image stream", as used herein, are synonymous. An image stream may be the output of a video camera or sensor, but it also may be a sequence of images produced by a device that produces a series of still images at a frame rate that is lower than what is conventionally considered to be video frame rates.

The terms "camera", "sensor", and "image sensor", as used herein are synonymous.

The term "real time", as used herein, refers to a level of computer/processor responsiveness that a user senses as sufficiently immediate.

Example embodiments are described herein with reference to block diagrams and flowchart illustrations. It is understood that a block of the block diagrams and flowchart illustrations, and combinations of blocks in the block diagrams and flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and flowchart block or blocks, and thereby create means (functionality) and/or structure for implementing the functions/acts specified in the block diagrams and flowchart blocks.

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and flowchart blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and flowchart blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and block diagrams may be separated into multiple blocks and/or the functionality of two or more blocks of the flowcharts and block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Figure 4A:
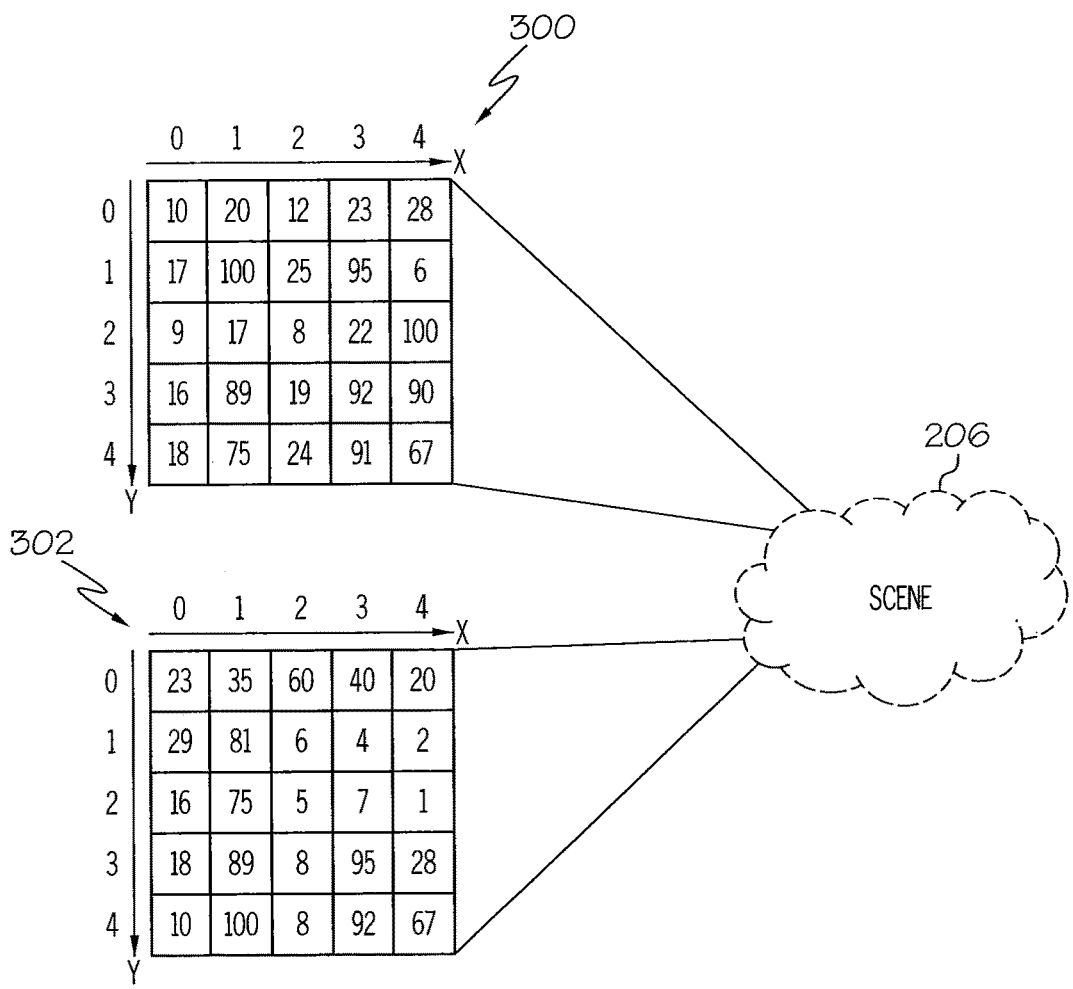
FIG. 4A illustrates two pixel arrays from respective video images of a scene.

FIG. 1 is a flow chart illustrating an exemplary process for creating composite images from multiple image streams according to some embodiments of the present invention. In FIG. 1, the process includes receiving multiple video images of a scene from respective video image sensors (Block 100). Each video image includes a respective array of pixels. For example, FIG. 4A illustrates two pixel arrays 300, 302 of two respective video images of a scene 206 taken by respective image sensors. The intensity or signal level of each pixel is displayed as a number. As illustrated in FIG. 4A, each pixel array includes an X,Y coordinate system and each pixel within a respective array can be represented as f(x, y), where x is the horizontal position of the pixel and y the vertical position. For example, the signal level of pixel f(1, 3) in the pixel array 300 is 89. Although two pixel arrays are illustrated in FIG. 4A, it is understood that any number of video images and corresponding pixel arrays can be used to create a composite video image in accordance with embodiments of the present invention.

Figure 2:
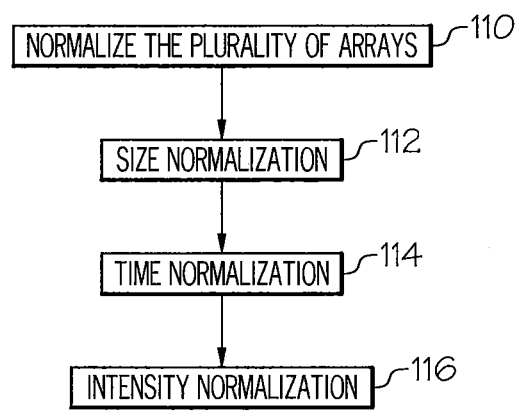

Referring back to FIG. 1, the pixel arrays associated with the respective video images may be normalized (Block 110) prior to creating a composite video image. For example, image sensors of different technologies may have different frame rates, may have different pixel array sizes, may have different bit pixels, etc. In addition, some pixel arrays may have RGB color information and an average pixel value may need to be determined. Thus, in order to accurately compare pixel values from different image sensors, particularly of different technologies, some normalization may be needed. FIG. 2 illustrates that normalization (Block 110) may include pixel array size normalization (Block 112), time (e.g., frame rate) normalization (Block 112), and/or pixel intensity normalization (Block 116).

Still referring to FIG. 1, a composite image is created by selecting pixels on a pixel-by-pixel basis from the plurality of video images, wherein each pixel of the composite image is selected from the video image having the pixel with the best signal level or signal-to-noise ratio (SNR) compared to the corresponding pixel of the other video images (Block 120), and displaying the composite image (Block 130). SNR for pixels is well known to those of skill in the art. See for example, http://www.cloudynights.com/page/articles/cat/fishing-for-photons/signal-to-noise-understanding-it-measuring-it-and-improving-it-part-2-understanding-one-pixel-r1902, which is incorporated herein by reference in its entirety.

In some embodiments, the pixels within a displayed composite image can be changed (Block 140), for example via user input and/or via stored user preference(s), as will be described below.

In some embodiments, at least one of the multiple video images is produced by a video image sensor mounted on a vehicle. Examples of vehicles include, but are not limited to, an aircraft, a watercraft, a spacecraft, an automobile, a truck, or a train. A composite image produced from multiple video images may be displayed to a person on the vehicle. For example, the composite image may be displayed to a pilot, a co-pilot, a crewmember, or a passenger of the vehicle. In some embodiments, the composite image may be displayed on a head-up display (HUD), which may be a head-mounted or wearable display, a vehicle-mounted display, or other configuration. The composite image may be displayed on a dedicated screen or display unit, or on a portion thereof.

The composite image may be transmitted to a display not on the vehicle. For example, the composite image may be transmitted to the displays of an air traffic controller, a remote operator, a transportation safety official, a member of law enforcement, or other person not on the vehicle. The composite image may be presented to a machine for additional processing. The composite image may be stored or recorded, either on the vehicle or off the vehicle.

In some embodiments, the composite video image has a higher object or image resolution than one or more of the multiple video images. For example, a visible light camera may have a higher image resolution or pixel density for a particular scene than an IR camera that is viewing the same scene. The composite image may include pixels selected from the visible light camera and pixels selected from the IR camera, in which case the composite image has a higher image resolution than the IR image.

Likewise, some objects or features of interest in the scene may be visible in one camera but not visible in another camera. As will be described in more detail below, the selection process will choose the portions of each image that has the highest information content for that pixel or group of pixels. As a result, pixels that show objects visible in a first camera (hereinafter referred to as "camera 1") but not visible in another camera (hereinafter referred to as "camera 2") will be selected for inclusion into the composite image from the image produced by camera 1, even though camera 1 has a lower image resolution than camera 2. In this manner, the composite image so produced will have a higher object resolution than the image produced by camera 2, even if the image resolution of camera 1 is less than the image resolution of camera 2. Likewise, pixels that show objects visible in camera 2 but not visible (or less visible) in camera 1 will be selected for inclusion into the composite image from the image produced by camera 2.

In addition, "super-resolution" techniques may be applied to convert a lower-resolution image into a higher-resolution image prior to or during creation of the composite image. Super-resolution techniques are well known to those of skill in the art. See for example, http://www.wisdom.weizmann.ac.il/~vision/single_image_SR/files/single_image_SR.pdf, which is incorporated herein by reference in its entirety.

In some embodiments, identifying which pixel has the better signal level or SNR includes using a user manual input to adjust relative weights of the corresponding pixels from each of the multiple video images prior to or during the selection process that results in the composite image. For example, pixels within a composite image can be changed responsive to user input, for example, via a user control and/or via user preferences. For example, in a composite image produced from the selection of pixels from a visible light image sensor and a non-visible light image sensor, a user control can allow a person to selectively change which pixels are displayed in the composite video image from the two image sensors. In some embodiments, user manual input may be stored as a user preference, which may be retrieved by a user and applied during operation to produce the composite image.

In some embodiments, when combining multiple sensor video streams to realize a higher resolution video, individual pixels or group of pixels from each sensor will be evaluated for dominant signal to noise relationships. Dominance can be defined and established using temperature measurements from each sensor and then applying super resolution techniques, nearest neighbor, bilinear, bicubic image interpolation and other relationship weighting relationship tools, for example.

Video images that may be used to generate a composite video image may be of any type, including, but not limited to, a visible light image, a non-visible light image, such as infrared (IR) or ultraviolet (UV) light, a millimeter wave radio frequency (MMWRF) image, a sub-millimeter wave radio frequency image (SMMWRF), a radio detection and ranging (RADAR) image, other radio frequency (RF) images, a sound navigation and ranging (SONAR) image, or a light detection and ranging (LIDAR) image. Doppler images (e.g., RADAR, SONAR, etc.) are also contemplated by the subject matter disclosed herein. In some embodiments, the multiple video images may be all of the same type; however, in other embodiments, they may be not all of the same type.

Figure 3:
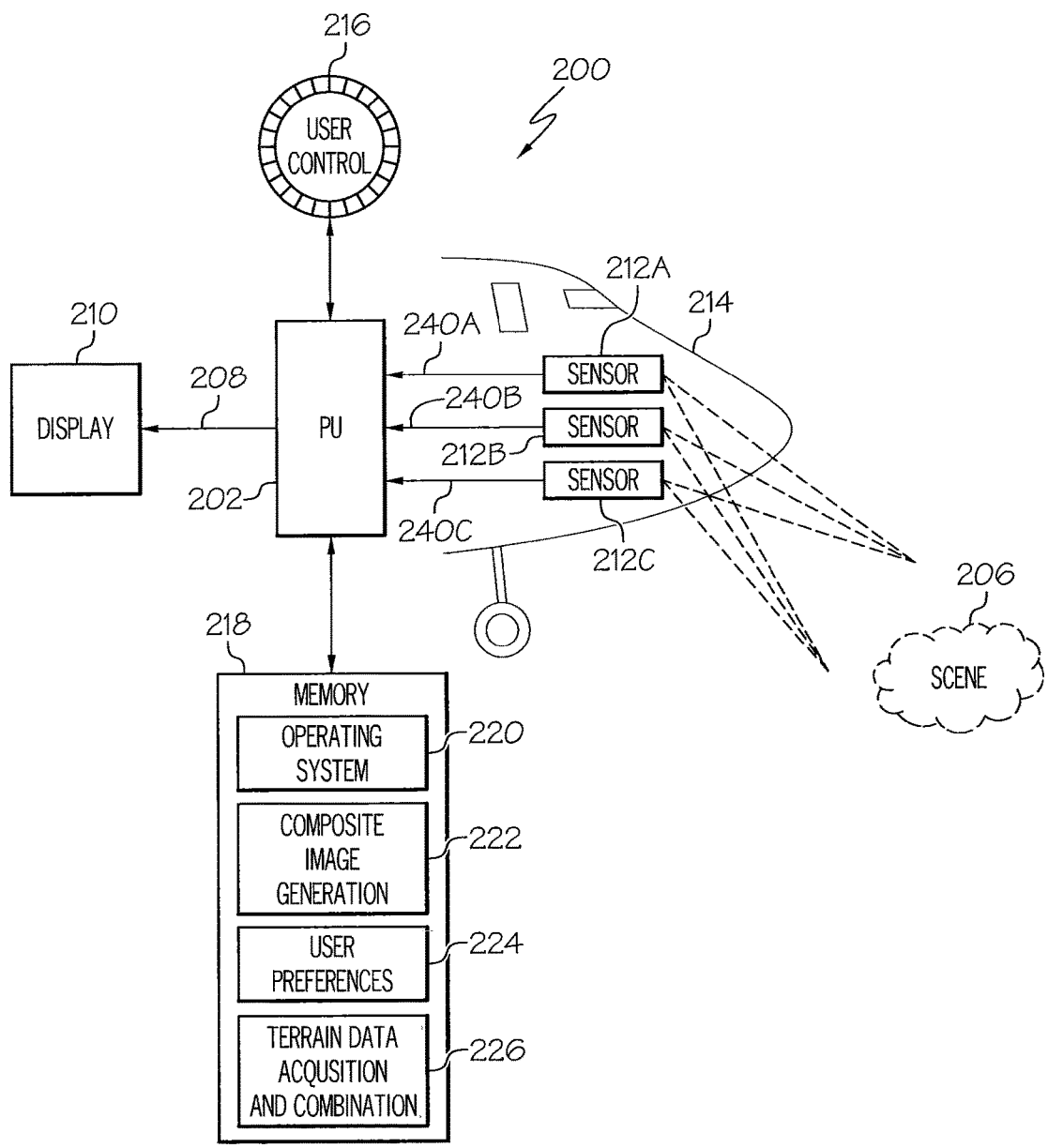
FIG. 3 is a block diagram illustrating an exemplary system for creating composite images from multiple image streams, according to some embodiments of the present invention.

FIG. 3 is a block diagram illustrating an exemplary system 200 for creating composite images from multiple image streams according to some embodiments of the present invention. In FIG. 2, system 200 includes a processing unit (PU) 202 that is configured to receive multiple video images from respective video image sensors directed towards the same scene 206. In the illustrated embodiment, three video image sensors 212A, 212B, 212C generate respective video images 240A, 240B, 240C. However, composite image generation systems, according to embodiments of the present invention, are not limited to the illustrated number of image sensors. Embodiments of the present invention may utilize any number of video image sensors. For example, two video image sensors may be utilized, as well as more than three.

According to embodiments of the present invention, one or more video image sensors may be mounted on a vehicle, such as an aircraft, a watercraft, a spacecraft, a land-based vehicle, e.g., an automobile, a truck, a train, etc. In the illustrated embodiment, all of the components of the system 200, including the video image sensors 212A, 212B, 212C, are located on a vehicle 214, such as an aircraft. However, in other embodiments, some of the components of system 200 may be located off of the vehicle 214.

In some embodiments, the image processing unit 202 may include an image processor(s), a military standard 1553 bus, and image optimization processors for multiple image sensors.

Figure 4B:
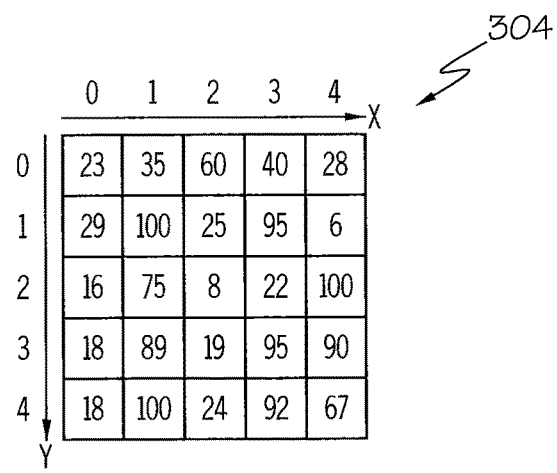
FIG. 4B illustrates an array of composite image pixels selected from the two pixel arrays of FIG. 4A, according to some embodiments of the present invention.

The image processor 202 creates a composite image 208 containing pixels selected on a pixel-by-pixel basis from the multiple video images 240A, 240B, 240C. For example, at each given position in a composite image pixel array, a pixel at the same position in one of the respective array of pixels that has a highest signal level or highest signal-to-noise ratio is selected. This is illustrated in FIGS. 4A-4B. FIG. 4A illustrates two pixel arrays 300, 302 of two respective video images of a scene 206 taken by respective image sensors. The intensity or signal level of each pixel is displayed as a value at each pixel position in the array. FIG. 4B illustrates an array of composite image pixels 304 selected from the two pixel arrays 300, 302 of FIG. 4A. At each position in the array of composite image pixels 304, the respective pixel from the two pixel arrays 300, 302 of FIG. 4A having the highest signal value has been selected and is displayed.

Referring back to FIG. 3, in some embodiments, the image processor 202 may produce a composite video image 208 that has a higher object resolution than at least one of the received video images 240A, 240B, 240C.

In the illustrated embodiment of FIG. 3, the system 200 includes a display 210 for displaying the composite image 208. The display 210 may be a wearable or vehicle-mounted head-up display, a conventional display, or both. The display 210 may include one or more display units.

In some embodiments, the image processor 202 may accept a user manual input to adjust relative weights of the pixels from each of the video images 240A, 240B, 240C prior to or during identifying the pixel which has the best signal level or SNR for selection and incorporation into composite image 208. The user manual input may be provided by a user control 216 associated with the image processor 202, such as an adjustable slider bar, spindle, etc. In some embodiments, the manual input value may be saved as a user preference that is stored in a memory 218, such as a database or other data storage system, and that may be retrieved or recalled by a user of system 200 and applied as a preset or user preference.

In some embodiments of the present invention, a user control 216, such as an adjustable slider bar or spindle, may be utilized to adjust the combined picture resolution to fit an individual pilot's preference. For example, such a control can be configured to adjust the concentration of either camera/sensor contribution to the combined picture from the default setting of dominant signal to noise by pixel by sensor. For example, sensor 1 may be adjusted to contribute 60% of the combined video image and sensor 2 may be adjusted to contribute 40% of the combined video image, etc. As another example, such a control can be configured to select and segregate the contribution of two sensors to the combined picture/video image so that sensor 1 and sensor 2 may be displayed based on distance from the aircraft to a runway. In the case where sensor 1 works at a longer distance, showing the shorter-range sensor 2 (e.g., an infrared (IR) sensor) at the bottom (or other location) of the screen may be preferred as IR is superior picture at short distances.

Exemplary image sensors 212A, 212B, 212C may include, but are not limited to, visible light sensors or cameras, non-visible light sensors, such as infrared (IR) or ultraviolet (UV) light cameras, millimeter wave radio frequency (MMWRF) cameras, sub-millimeter wave radio frequency (SMMWRF) cameras, other active or passive radio frequency (RF) cameras or sensors, RADAR, SONAR, LIDAR, and Doppler RADAR or other Doppler imaging systems. The multiple image sensors may be all of the same type in some embodiments. In other embodiments, they may be not all of the same type.

In some embodiments, polarizing filters may be used in front of visible or non-visible light sensors to reduce stray energy from entering the sensor, for example. In some embodiments, a sensor may include a controllable polarizing filter, e.g., to control the direction or amount of polarization imposed by the filter. Such filters may be controlled manually (e.g., by a pilot of an aircraft utilizing the system 200), automatically by the system 200, or both (e.g., automatic with manual override.)

As illustrated in FIG. 3, a memory 218 is associated with the image processor 202 to implement various embodiments of the present invention. The illustrated memory 218 is representative of the overall hierarchy of memory devices containing software and data used to perform the various operations described herein. The memory 218 may include, but is not limited to, the following types of devices: cache, ROM, PROM, EPROM, EEPROM, flash, SRAM, and DRAM. The memory 218 may hold various categories of software and data: an operating system 220, a composite image generation module 222, user preferences module 224, and a terrain and data acquisition/combination module 226.

The operating system 220 may manage the resources of one or more devices used to implement embodiments of the present invention and may coordinate execution of various programs (e.g., the composite image generation module 222, user preferences module 224, terrain and data acquisition/combination module 226 etc.) by the image processor 202. The operating system 220 can be any operating system suitable for use with a data processing system, such as IBM®, OS/2®, AIX® or z/OS® operating systems, Microsoft® Windows® operating systems, Android®, Unix or Linux™, etc.

The composite image generation module 222 comprises logic for receiving a plurality of video images from respective video image sensors (Block 100, FIG. 1), normalizing the pixel arrays (Block 110, FIG. 1; Blocks 112-116, FIG. 2), if necessary, creating a composite video image from the multiple video images by selecting pixels from the respective multiple video images (Block 120), and displaying the composite image (Block 130, FIG. 1). In addition, the composite image generation module 222 may comprise logic for receiving a video image from each of a plurality of video image sensors, at least one of which is mounted to a vehicle, combining the plurality of video images according to an algorithm to produce an output video image, and adjusting the algorithm based on a state or condition of the vehicle (Blocks 600-604, FIG. 7). Furthermore, the composite image generation module 222 may comprise logic for receiving a video image from each of a plurality of video image sensors, wherein at least one of the plurality of video image sensors is mounted to a vehicle, pre-enhancing (e.g., applying a super-resolution technique, etc.) at least one of the plurality of video images, and combining the plurality of video images to produce an output video image (Blocks 700-704, FIG. 8).

The user preferences module 224 comprises logic for changing a displayed composite image based upon stored or pre-set user preferences (Block 140, FIG. 1). The terrain and data acquisition/combination module 226 comprises logic for receiving and using ground data to determine expected image features (Blocks 800-806, FIG. 9.)

Figure 5:
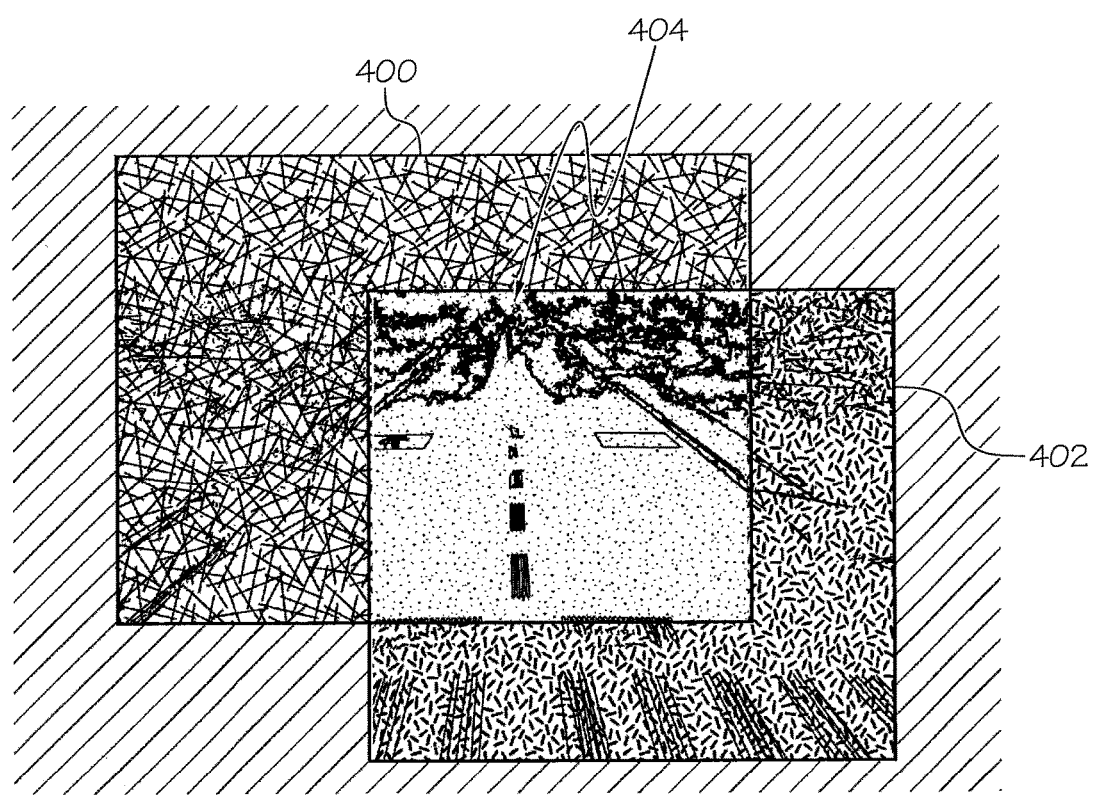
FIG. 5 illustrates a composite video image created from two separate video images of a scene, according to some embodiments of the present invention.

FIG. 5 illustrates a composite video image 404 created from two separate video images of a scene, according to some embodiments of the present invention. The illustrated composite video image 404 is overlaid on the two video images 400, 402 from which the composite video image 404 is created. As illustrated, the composite video image 404 has greater resolution than either of the video images 400, 402.

Figure 6A:
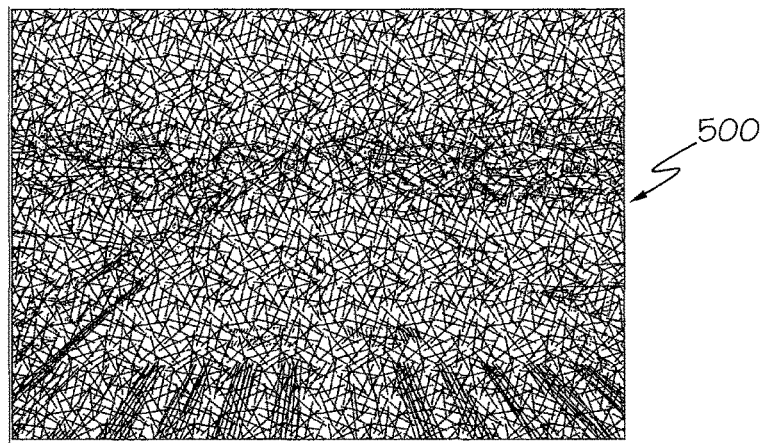
FIG. 6A is a video image of a scene taken by a first video image sensor.
Figure 6B:
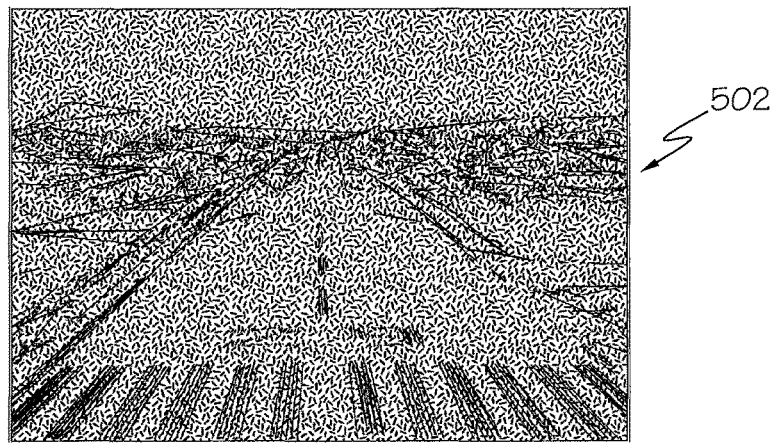
FIG. 6B is a video image of the same scene of FIG. 6A taken by a second video image sensor of a different technology than the first video image sensor.
Figure 6C:
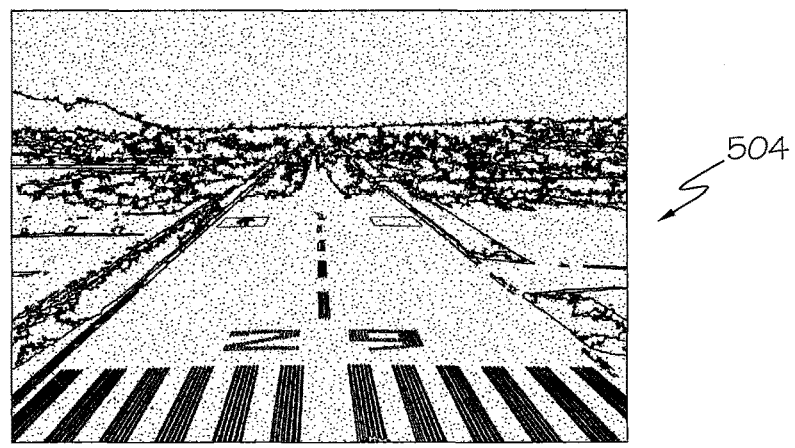
FIG. 6C is a composite video image created from the two video images of FIGS. 6A-6B, according to some embodiments of the present invention.

FIG. 6A is a video image 500 of an airport runway taken by a first video image sensor mounted to an aircraft as the aircraft approaches the runway. The runway is barely visible because of fog. FIG. 6B is a video image of the same scene of FIG. 6A taken by a millimeter wave video image sensor. FIG. 6C is a composite video image 504 created from the two video images 500, 502 of FIGS. 6A-6B. The composite video image 504 clearly displays the runway despite the presence of fog.

Figure 7:
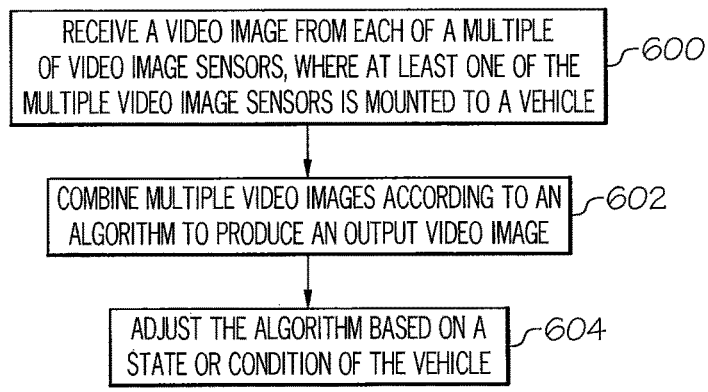
FIGS. 7-9 are flow charts illustrating exemplary processes for creating composite images from multiple image streams, according to some embodiments of the present invention.

FIG. 7 is a flow chart illustrating an exemplary process for creating composite images from multiple image streams according to other embodiments of the present invention. In the embodiment illustrated in FIG. 7, the process includes receiving a video image from each of multiple video image sensors, where at least one of the multiple video image sensors is mounted to a vehicle (Block 600), combining the multiple video images according to an algorithm to produce an output video image (Block 602), and adjusting the algorithm based on a state or condition of the vehicle (Block 604). Examples of a state or condition of the vehicle upon which the algorithm may be adjusted include, but are not limited to: the height of the vehicle above ground or water; the depth of the vehicle below water; the geographic location of the vehicle; the position of the vehicle relative to an obstacle; an absolute or relative quality or characteristic of at least one of the multiple video sensors; an absolute or relative quality or characteristic or at least one of the video images; and a speed, heading, or attitude of the vehicle.

Adjusting the algorithm may include, but is not limited to, modifying a coefficient of the algorithm, adding, subtracting, or modifying a term of the algorithm, or changing the algorithm. Adjusting the algorithm may include performing multiple different algorithms, and either selecting the output of one the multiple algorithms instead of the output of the other algorithms, or combining the outputs of at least two of the multiple algorithms.

Figure 8:
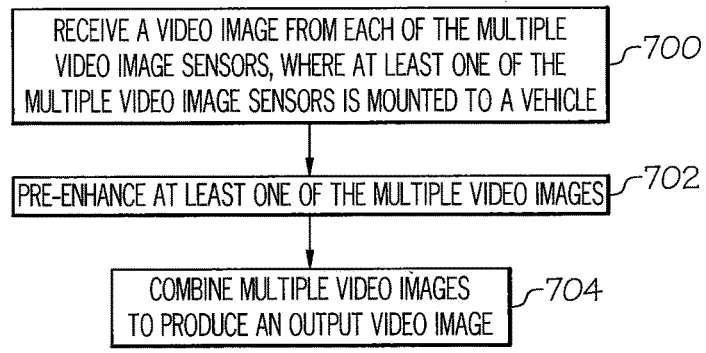

FIG. 8 is a flow chart illustrating an exemplary process for creating composite images from multiple image streams according to some embodiments of the present invention. In FIG. 8, the process includes receiving a video image from each of multiple video image sensors, where at least one of the multiple video image sensors is mounted to a vehicle (Block 700), pre-enhancing at least one of the multiple video images (Block 702), and combining the multiple video images to produce an output video image (Block 704). In some embodiments, enhancing at least one of the multiple video images includes applying a super-resolution technique to the video image to increase the resolution of the video image prior to or during production of the output video image. For example, single image super resolution and fractal interpolation techniques can be used to enhance the source images before or after multiple sources are combined into a single video output.

Figure 9:
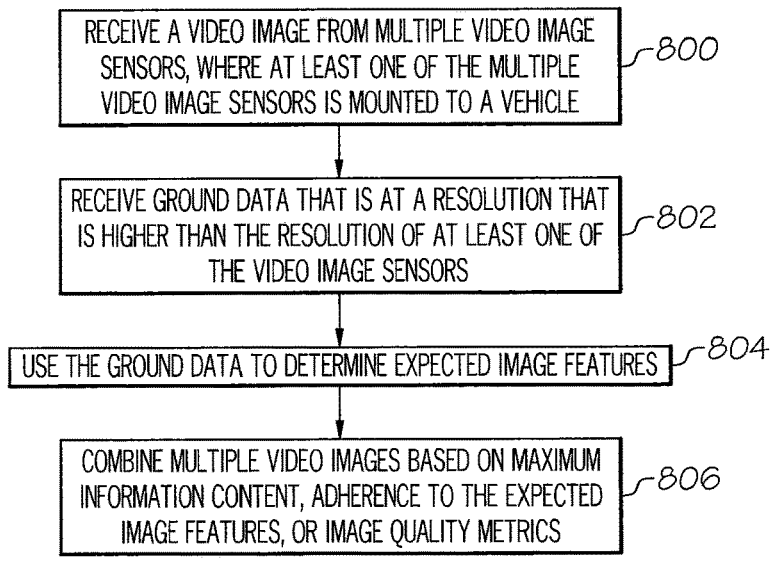

FIG. 9 is a flow chart illustrating an exemplary process for creating composite images from multiple image streams according to other embodiments of the present invention. In the embodiment illustrated in FIG. 9, the process includes receiving a video image from each of multiple video image sensors, where at least one of the multiple video image sensors is mounted to a vehicle (Block 800), receiving ground data that is at a resolution that is higher than the resolution of at least one of the video image sensors (Block 802), using the ground data to determine expected image features (Block 804), and combining the multiple video images based on maximum information content, adherence to the expected image features, and/or image quality metrics (Block 806).

Examples of ground data include, but are not limited to, images, representations, models, or descriptions of features on the ground provided by sources not on the vehicle that receives the ground data. Sources of ground data include, but are not limited to, ground-based cameras, satellite cameras, or cameras on other vehicles. Features on the ground may include, but are not limited to, objects, structures, obstacles, terrain, environmental conditions, and other conditions on the ground, and may represent real features, such as buildings, runways, etc., as well as imaginary or calculated features, such as flight paths, storm trajectories, anticipated flood levels, and other features that may be of importance to the state or operation of a vehicle. For example, a composite video image may show telephone poles, but not have sufficient information and/or resolution to show the wires extending between the poles. The terrain and data acquisition/combination module 226 (FIG. 3) can add the wires to the final composite image.

In some embodiments, combining the multiple images based on ground data may include selecting all or portions of a video image that includes the most information about an expected feature or the most information about all expected features. In some embodiments, combining the multiple images based on ground data may include selecting all or portions of a video image that includes information that most closely matches some or all expected features or that most closely matches the highest number of expected features. In some embodiments, combining the multiple images based on ground data may include selecting all or portions of a video image having the best image quality, the clearest image, the image with the greatest range, depth, or width of vision, or other image quality metric.

Transition Management

In some embodiments of the present invention, methods and systems described herein include algorithms (e.g., that are executed by an image processor, such as image processor 202 of FIG. 3) that control how a portion (or all) of an image transitions from being provided by one sensor to being provided by another sensor. These "image boundaries" between images provided by one sensor and images provided by another sensor exist not only in a static frame (spatial transitions) but also exist as transitions between frames (temporal transitions).

In some embodiments of the present invention, for example, a composite video image generation system, such as system 200 of FIG. 3, includes both a high resolution sensor with shorter range fog penetration capability and a low resolution sensor with longer range fog penetration capability. At greater distances or in thicker fog situations, the low resolution sensor will have the greater image content and will need to be prominent on the display. As the higher resolution sensor gradually increases in image content, the system needs to smoothly make the temporal transition to give the higher resolution sensor more prominence on the display. Different areas of the scene on a single frame will also vary in terms of the content that is visible to the different sensors. Thus, an optimally combined image is likely to be a non-uniform combination of the two image sources. It may be desirable to have smooth spatial transitions within each frame of the combined image. The spatial transition metrics may inform the temporal transition metrics, and vice versa. In some embodiments, algorithms may be employed to manage spatial and/or temporal transitions between image sources with different image resolutions.

Quantitative Image Quality Metrics

In some embodiments of the present invention, quantitative measures of image quality may be used for sensor image combination bias decisions. Examples of image quality metrics include, but are not limited to, the modulation transfer function area (MTFA), the square root integral (SQRI), and the J Index. All of these can be used to predict perceived image quality in static images with a high degree of accuracy. For example, some studies have shown correlations between these metrics and image quality ratings as high as 99% in static images.

In some embodiments of the present invention, methods and systems described herein may apply such metrics to dynamic images coming from multiple sensor sources for the purpose of computing the best way to combine the sensor outputs to produce the highest quality combined sensor image. Because the image quality metrics require a great deal of computational power (e.g., for Fourier Transforms to convert images to the spatial frequency domain), in the past, their utility has been limited to making measurements on static images. The current state of computational power now makes it possible to apply these metrics to real time images. In some embodiments, such metrics may be applied to sampled video image frames, rather than to each frame, as a means to reduce the processing overhead. In such embodiments, therefore, the application of image quality metrics may be coupled with some form of statistical quality control to the stream of image frames passing through the sensors and being combined to form a composite image.

Statistical Techniques

In some embodiments of the present invention, statistical techniques may be used in combination with quantitative measures of image quality for pre-processed and real-time optimization of sensor image combination processing parameters. Image processing includes a variety of factors that can be adjusted individually as well as in concert with each other to attain a higher image quality. The optimal adjustment of such parameters can be achieved in various ways including manual adjustments based on experience and trial and error.

In some embodiments of the present invention, methods and systems described herein may include the use of statistical techniques, including, but not limited to, iterative hill climbing, as well as advanced statistical sampling techniques, including but not limited to, central composite response surface methodology. The use of objective experiments can result in the highest image quality that can be achieved at the lowest cost. By employing these techniques, a more accurate and reliable set of image processing parameters can be discovered for things such as the amount of image source contribution, contrast stretching, filtering, and feature enhancement to employ on the combined sensor image. In some embodiments, for example, raw sensor data may be collected, and tests may be run to determine which combination of parameters give the best composite image. These best combinations of parameters may be pre-stored in a composite image generation system (e.g., system 200 of FIG. 3) for selection by a user, such as a pilot of an aircraft, etc. Alternatively, the information could also be stored in a database associated with a composite image generation system for automatic or interpolated use depending on measured or manually reported external conditions.

Synergistic Techniques

In some embodiments of the present invention, methods and systems described herein may use multiple data sources such as aircraft position, attitude, velocity, acceleration data with terrain model data and terrain feature coordinate data (such as GPS coordinates for approach and runway lights, runway threshold, runway edges, VASI (visual approach slope indicator), Tower, etc.) to predict and enhance combined sensor imagery. The availability of high speed graphics computation and high resolution terrain models along with accurate aircraft attitude and positioning data (e.g., real time kinematic GPS and other GPS enhancements such as Omnistar® services) make it possible to precisely predict the expected location of features in the external scene and where they should appear on a sensor's output.

In some embodiments of the present invention, these predictions are compared with the actual output of the sensors to determine the appropriate bias contribution from each sensor. In essence, the sensor output correlation with the predicted location of known items that should appear in the scene would be computed on a frame by frame or less frequent basis. Examples of known items include buildings, roads, bridges and other man-made structures, approach lights, runway edges, runway edge lights and centerline lights, runway threshold, VASI, as well as natural terrain features such as hills and water. The sensor that has the highest correlation with the predicted external scene would be given the higher bias contribution for the combined sensor output. In addition, correlation with the computed scene features could be used to boost or highlight this information in the combined sensor output.

Dynamic Optimization

In some embodiments of the present invention, methods and systems described herein may include a process to dynamically optimize parameters used in the creation of composite images. For example, the quantitative image quality metrics, statistical techniques, or synergistic techniques described above (as well as other techniques) may provide information that may be used to modify system or function parameters. To give just one example, image quality metrics may be used to tweak rates of spatial or temporal transitions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A vehicle navigation method, comprising:
   receiving from a plurality of video image sensors associated with the vehicle a respective plurality of video images of a scene, wherein each video image comprises a respective array of pixels;
   creating a composite video image of the scene from the plurality of video images, wherein the composite video image includes an array of composite image pixels, and wherein each composite image pixel in the array of composite image pixels is selected from a respective pixel in one of the respective array of pixels that has a highest signal level or highest signal-to-noise ratio; and
   displaying on a display the composite video image in real time so that the vehicle can be navigated in real time using the displayed composite video image.

2. The vehicle navigation method of claim 1, wherein at least one of the plurality of video image sensors is mounted on the vehicle.

3. The vehicle navigation method of claim 1, wherein the plurality of video image sensors are selected from visible light image sensors, non-visible light image sensors, radio-frequency (RF) image sensors, sound navigation and ranging (SONAR) image sensors, light detection and ranging (LIDAR) image sensors, and Doppler image sensors.

4. The vehicle navigation method of claim 1, wherein the plurality of video image sensors are of respective different technology types.

5. The vehicle navigation method of claim 1, further comprising changing one or more composite image pixels in the displayed composite video image responsive to user input and/or responsive to user preference.

6. A method of creating a composite video image that includes an array of composite image pixels, the method comprising:
   receiving from a plurality of video image sensors a respective plurality of video images of a scene, wherein each video image comprises a respective array of pixels;
   selecting for a composite image pixel at a given position in the array of composite image pixels a pixel at the given position in one of the respective array of pixels that has a highest signal level or highest signal-to-noise ratio.

7. The method of claim 6, wherein the selecting is repeatedly performed for a plurality of given positions in the array of composite image pixels.

8. The method of claim 6, comprising displaying the composite video image.

9. The method of claim 6, wherein at least one of the plurality of video image sensors is mounted on a vehicle.

10. The method of claim 6, wherein the composite video image has a higher object resolution than at least one of the plurality of video images.

11. The method of claim 6, wherein the plurality of video image sensors are selected from visible light image sensors, non-visible light image sensors, radio-frequency (RF) image sensors, sound navigation and ranging (SONAR) image sensors, light detection and ranging (LIDAR) image sensors, and Doppler image sensors.

12. The method of claim 6, wherein the plurality of video image sensors are of respective different technology types.

13. The method of claim 6, further comprising changing one or more composite image pixels responsive to user input and/or responsive to user preference.

14. An imaging system, comprising:
   first and second video image sensors configured to generate respective first and second video images of a scene, wherein the first and second video images comprise respective first and second arrays of pixels;

an image processor configured to receive the first and second video images and create a composite video image that includes an array of composite image pixels, wherein, for a given pixel position in the composite pixel array, the image processor selects a pixel at the given position from one of the first and second arrays of pixels that has a highest signal level or highest signal-to-noise ratio.

15. The imaging system of claim 14, comprising a display configured to display the composite video image.

16. The imaging system of claim 15, further comprising a user control associated with the image processor that allows a user to change composite image pixels displayed within the display.

17. The imaging system of claim 15, wherein the image processor is configured to change composite image pixels responsive to a stored user preference.

18. The imaging system of claim 14, wherein at least one of the plurality of video image sensors is mounted on a vehicle.

19. The imaging system of claim 14, wherein the composite video image has a higher object resolution than at least one of the first and second video images.

20. The imaging system of claim 14, wherein the first and second video image sensors are selected from visible light image sensors, non-visible light image sensors, radio-frequency (RF) image sensors, sound navigation and ranging (SONAR) image sensors, light detection and ranging (LIDAR) image sensors, and Doppler image sensors.

21. The imaging system of claim 14, wherein the first and second video image sensors are of different technologies.

22. A computer program product for creating a composite video image that includes an array of composite image pixels, the computer program product comprising a non-transitory computer readable storage medium having encoded thereon instructions that, when executed on a processor, cause the processor to perform operations comprising:

receiving from a plurality of video image sensors a respective plurality of video images of a scene, wherein each video image comprises a respective array of pixels; and selecting for a composite image pixel at a given position in the array of composite image pixels a pixel at the given position in one of the respective array of pixels that has a highest signal level or highest signal-to-noise ratio.

23. The computer program product of claim 22, wherein the computer readable storage medium has encoded thereon instructions that, when executed on the processor, cause the processor to repeatedly perform the selecting for a plurality of given positions in the array of composite image pixels.

24. The computer program product of claim 22, wherein the computer readable storage medium has encoded thereon instructions that, when executed on the processor, cause the processor to display the composite image.

25. A method for creating a video image, comprising:
receiving a video image from each of a plurality of video image sensors, wherein at least one of the plurality of video image sensors is mounted to a vehicle;
receiving ground data that is at a resolution that is higher than the resolution of at least one of the video image sensors;
using the ground data to determine expected image features; and
combining the plurality of video images based on at least one of a maximum information content, adherence to the expected image features, and image quality metrics.

26. The method of claim 25, wherein the ground data comprises images, representations, models, or descriptions of features on the ground provided by sources not on the vehicle.

27. The method of claim 25, wherein the sources of the ground data comprise ground-based cameras, satellite cameras, or cameras on other vehicles.

* * * * *